Nov. 1, 1949         J. R. HOLLINS         2,486,599
LIGHTING CIRCUIT CONDITION INDICATOR
Filed Aug. 5, 1947

INVENTOR.
BY *Jesse R. Hollins*
*Day James*
his ATTORNEY

Patented Nov. 1, 1949

2,486,599

UNITED STATES PATENT OFFICE 2,486,599

LIGHTING CIRCUIT CONDITION INDICATOR

Jesse R. Hollins, New York, N. Y.

Application August 5, 1947, Serial No. 766,235

2 Claims. (Cl. 177—311)

This invention relates to indicating electrical circuits and, more particularly, to electric lighting and signal circuits, for motor vehicles or the like, adapted to indicate operative and inoperative conditions of the circuits.

Various arrangements have been proposed for furnishing indications of the operative condition of a lighting circuit. Such arrangements are designed, for example, to illuminate a pilot light when an associated lighting circuit is energized or, alternatively, deenergized.

Among other applications, signalling arrangements have been proposed for advising a driver as to the condition, and state of energization, of lighting or signalling circuits on a motor vehicle. In a typical example, such arrangements illuminate a pilot light when a head lamp switch is operated. If the head lamp is burned out, or there is an open circuit, the pilot light is not illuminated when the head lamp switch is operated. Thus, the driver is immediately apprised of a defective condition of the head lamp circuit.

Prior art devices for signalling the condition of electrical circuits, however, have been unduly complicated or required the use of expensive electrical equipment. As an instance, a relay or the like has usually been incorporated to operate a pilot light in an automobile lighting circuit. These complications and additional expense have mitigated against public adoption of such circuits.

In contrast, the present invention involves only a very simple and inexpensive alteration in the usual lighting circuit. For example, as applied to that type of circuit in which a relative low resistance, high candle power electric lamp is connected in series circuit relation with its control switch, all that is required is the connection of a high resistance pilot or indicating lamp in shunt circuit relation with the control switch and in series circuit relation with the main lamp itself.

The resistance of the indicating light is high and that of the main lamp is relatively low. Consequently, when the control switch is open, current flows through both lamps in series but is insufficient, due to the high resistance of the pilot lamp, to illuminate the main lamp. When the control switch is closed, the pilot lamp is shunted and all the current flows through the main lamp, effecting illumination of the latter.

As applied to an automobile lighting system, both the pilot lamp and the light control switch are connected in parallel to the ignition switch, which latter is connected to the ungrounded battery terminal. The pilot lamp and light control switch are each separately connected in series to ground through the main head lamp, tail lamp, stop light or the like. When the ignition switch is closed and the light switch is open, the pilot lamp lights, provided the main lamp is in good condition. When the light switch is closed, the pilot lamp is extinguished, provided there is no open circuit on either side of the light switch. Thus, the pilot lamp gives indications of the operative or inoperative condition of the main lamp and its associated circuit.

In one practical embodiment, the invention may be applied to indicate the operativeness of an automotive stop light circuit. In such case, a high resistance, low candle power indicator or pilot lamp is connected in series circuit relation with the ignition switch and the low resistance, high candle power stop lamp. The brake operated stop lamp switch is connected in series with the battery and stop lamp, and in shunt with the pilot lamp.

When the ignition switch is closed, the pilot lamp lights, but the current flow is insufficient to light the stop lamp. However, when the brake is operated and closes the stop lamp switch, the pilot light is extinguished, by shunting, and the stop lamp is lighted. Should the stop lamp be inoperative, this will be indicated by failure of the pilot lamp to light when the ignition switch is closed. Similarly, should the pilot lamp remain lit when the brake is operated, this would indicate a defect in the stop lamp circuit.

In another practical embodiment, the invention may be applied to a directional signal lamp circuit in which a rotatable switch is used to energize "right" or "left" sets of directional signal lamps when the vehicle is preparing to make a turn. A pair of pilot lamps are provided in connection with each set of directional signal lamps each connected in series with the ignition switch and one set of directional lamps. When the ignition switch is closed and the directional switch in its neutral position, all pilot lamps are lit. When the directional switch is operated to indicate a turn, the corresponding pilot lamps for the direction involved are shunted and extinguished, if the circuit connections are operative. In this arrangement, all pilot lamps are included in the signal assembly mounted on the steering column. Also, the stop lamp circuit pilot lamp may be mounted on the assembly for compactness and easy visibility.

It is therefore among the objects of this invention to provide a simple and inexpensive condition indicator for a lighting circuit.

Another object is to provide such an indicator which is inexpensive and requires no relays or the like.

A further object is to provide an indicator for a stop light or signalling system of a motor vehicle effective to give indications of the operative conditions of such systems.

These, and other objects, advantages, and novel features of the invention, will be apparent from the following description and the accompanying drawing.

While the invention is applicable to all types of lighting systems such as house lighting systems, automobiles' head lamps and tail lamps circuits and the like, it will, for purposes of illustration only, be described more particularly as applied to stop light and signalling circuits for automotive vehicles.

Figure 1:
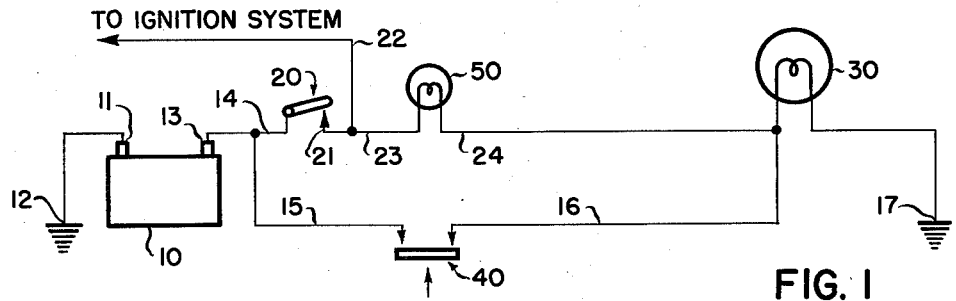
Fig. 1 is a circuit diagram of an automobile stop light system incorporating the indicating arrangement of the present invention.

Referring to Fig. 1, the invention is illustrated as incorporated with an automobile ignition and stop light system, including a source of electrical current, such as the usual storage battery indicated at 10, and ignition switch, indicated at 20, a stop light or lamp 30 and a brake operated stop light control switch 40. One terminal 11 of battery 10 is connected to ground at 12 in the usual manner. The other terminal 13 is connected by a circuit 14 to ignition switch 20. A second circuit 15 connects terminal 13 to a contact of switch 40. The other contact of switch 40 is connected by a circuit 16 to one terminal of a low resistance, high candle power, stop lamp 30. The other terminal of stop lamp 30 is connected to ground at 17 in the usual manner.

The normally open contact 21 of ignition switch 20 is connected in the usual manner to an ignition circuit 22 leading to the coil, spark plugs and the like of the car, which have not been shown as they form no part of the present invention. In accordance with the present invention, a circuit 23 connects one terminal of a high resistance, low candle power, pilot or indicating lamp 50 to contact 21 of switch 20. The other terminal of pilot lamp 50 is connected by a circuit 24 to circuit 16 beyond switch 40. For purposes of ready observation, lamp 50 is desirably mounted on the dashboard of the vehicle.

From the foregoing, it will be observed that pilot lamp 50 and ignition switch 20 are connected in series circuit relation between battery 10 and stop lamp 30. Similarly, switch 40 is in series circuit relation with source 10 and stop lamp 30. However ignition switch 20 and lamp 50 are shunted by switch 40 when the latter is closed as by operation of the brake pedal.

With the foregoing arrangement, and assuming that stop lamp 30 is operative and all the circuit connections are in operative condition, when ignition switch 20 is closed to energize the ignition system of the car, pilot lamp 50 will be illuminated. Current will flow in series from source 10 through switch 20, pilot lamp 50 and stop lamp 30. Due to the relatively high resistance of pilot lamp 50, the current flow will not be sufficient to effect illumination of stop lamp 30. Should pilot lamp 50 not be lighted when switch 20 is closed, it will indicate to the operator of the vehicle that stop lamp 30 is either burned out or there is an open circuit between source 10 and stop lamp 30.

When the brake pedal is operated, switch 40 is closed. This shunts pilot lamp 50, as current flows directly from terminal 13 to stop lamp 30. Pilot lamp 50 is accordingly extinguished, if all the circuit connections are in order. For example, should there be an open circuit between source 10 and switch 40, pilot lamp 50 would remain lighted when the brake pedal is depressed, thus advising the operator of such open circuit. A simple and effective means of readily indicating the operative condition of stop lamp 30 and its associated circuit connections is thus provided.

Figure 2:
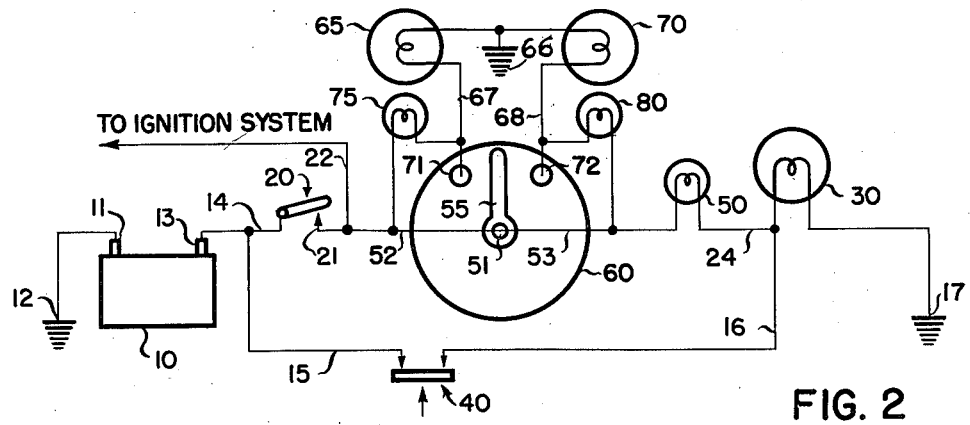
Fig. 2 is a circuit diagram, incorporating the circuit of Fig. 1, and illustrating the invention as further applied to an automobile signalling system including two signal lamps.

Fig. 2 illustrates the invention as further applied to directional signalling lamps for a motor vehicle. Referring to this figure, the indicating and lighting circuit for stop lamp 30 is substantially the same as that in Fig. 1, except that the circuit of pilot lamp 50 extends through the pivot point 51 of a rotatable control switch 55 mounted on a switch plate 60. A circuit 15 connects battery terminal 13 to switch 40, and this switch is connected by circuit 16 to stop lamp 30. Circuit 52 connects ignition switch contact 21 to point 51, which latter is connected by circuit 53 to pilot lamp 50. Circuit 24 connects lamp 50 to circuit 16.

A pair of high candle power, low resistance directional signalling lamps 65, 70 are provided, each having one terminal connected to ground as at 66. Circuits 67, 68 connect the other terminals of lamps 65, 70 to contacts 71, 72 on switch plate 60. Low candle power, high resistance pilot lamps 75, 80 are respectively associated with signalling lamps 65 and 70, and each have one terminal connected to point 51 and the other terminal to circuits 67 or 68, respectively. While the pilot lamps are shown, for convenience, as connected to point 51 through circuits 52 and 53, in practice, the connection to point 51 is made directly.

In this arrangement, when ignition switch 20 is closed, pilot lamps 75, 80 are lit, provided signal lamps 65, 70 are in good order. Lamps 65, 70 are not lit, as the pilot lamps limit the current flow to too low a value to illuminate the signal lamps.

If control switch 55 is engaged with contact 71, lamp 65 is lit and pilot lamp 75 is extinguished, if the circuit connections are in good order. Similarly, if contact arm 55 is engaged with contact 72, lamp 70 is lit and pilot lamp 80 is extinguished. If the pilot lamp fails to extinguish when the signal lamps are energized, circuit trouble is indicated.

The stop lamp circuit operates in the same manner as in Fig. 1. When ignition switch 20 is closed, pilot lamp 50 is lit. When brake-operated switch 40 is closed, pilot lamp 50 is extinguished and stop lamp 30 is lit. Should either of these results fail to occur, circuit trouble or an inoperative lamp is indicated to the operator.

Figure 3:
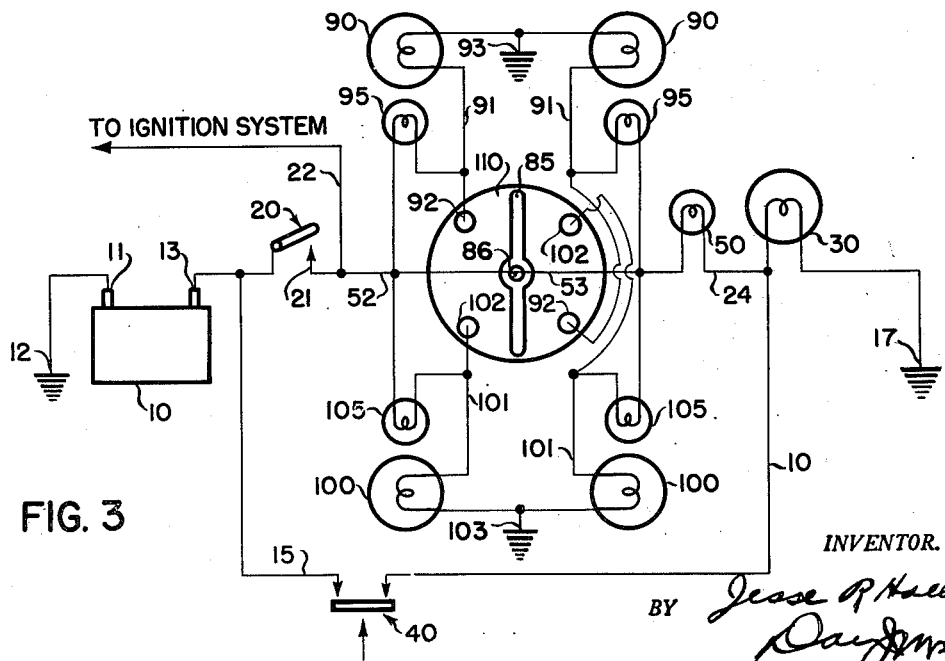
Fig. 3 is a circuit diagram, incorporating the circuit of Fig. 1, and illustrating the invention as further applied to two sets of lamps, such as pairs of signalling lamps or pairs of head lamp filaments.

Fig. 3 illustrates an arrangement incorporating two sets of signal lamps, in addition to the stop lamp circuit of Fig. 1. The two sets of lamps, 90, 90 or 100, 100 may, for example, be mounted on either side of the vehicle, at the front and rear thereof, for signalling purposes. However, to simplify the description, it will be assumed that the lamps are turn indicating, front and rear signal lamps.

The circuits for stop lamp 30 and its high resistance, low candle power pilot lamp 50 are the same as previously described. Stop lamp 30 is connected to ungrounded battery terminal 13 by circuit 15, brake operated switch 40 and circuit 16. Circuit 52 connects contact 21 of ignition switch 20 to center point 86 of contact arm 85 rotatably mounted on switch plate 110. Pilot lamp 50 is connected to point 86 by circuit 53 and to stop lamp 30 by circuit 24.

When ignition switch 21 is closed, lamp 50 lights but prevents sufficient current flow to lamp 30 to light the latter. When brake switch 40 is closed, lamp 50 is shunted and lamp 30 is lit, provided the circuit connections and lamp 30 are functioning properly. Should lamp 50 remain lit, with switch 40 closed, circuit or lamp trouble is indicated to the vehicle operator.

Lamps 90, 90 are connected by circuits 91, 91 to diametrically opposite contacts 92, 92 of switch plate 110. Similarly, circuits 101, 101, connect lamps 100, 100 to diametrically opposite contact points 102, 102 of the switch plate. Lamps 90, 90 are grounded at 93 and lamps 100, 100 are grounded at 103.

Pilot lamps 95, 95 and 105, 105 are provided for lamps 90, 90 and 100, 100 respectively. One terminal of each lamp 95 is connected to point 86, as by circuit 52, and the other lamp terminals are connected, through circuits 91, to lamps 90. Similarly, circuit 53 connects one terminal of each lamp 105 to point 21, and the circuits 101 connect the other terminals of lamps 105, 105 to lamps 100, 100. In practice, pilot lamps 95, 105 have one terminal connected directly to point 86 rather than through circuits 52, 53. The signal lamps 90, 100 are low resistance, high candlepower lamps, whereas pilot lamps 95, 105 are high resistance, low candle power lamps.

Thus, when ignition switch 20 is closed, and assuming all circuit connections are operative, all four pilot lamps 95, 95, 105, 105 as well as pilot lamp 50, are lit. If a left turn is to be made, for example, arm 85 is rotated to engage contacts 92. This shunts pilot lamps 95, which are thus extinguished, and lights signal lamps 90. Should either pilot lamp 95 remain lit, circuit trouble is indicated. When arm 85 is swung to engage contacts 102, pilot lamps 105 are shunted and extinguished and signal lamps 100 are lit, assuming the circuit connections and lamps 100 are in good order. If not, one or the other of pilot lamps 105 remains lit, indicating where the trouble is located.

All the pilot lamps 90 and 105 are preferably mounted on the directional switch assembly. Also, pilot lamp 50, for the brake operated lamp 30, is preferably mounted on the switch assembly. Consequently, when ignition switch 20 is closed, all five pilot lamps, 50, 95, 95 and 105, 105 are lit, if the circuit connections are electrically effective and lamps 30, 90—90 and 100—100 are operative.

When a turn in a particular direction is made, the brakes are usually applied. Under usual conditions, accordingly, one set of the signal pilot lamps 95 or 105 and stop pilot lamp 50 will be extinguished in succession when the vehicle prepares to make and then proceeds to negotiate the turn. Should the pilot lights remain lit, an inoperative condition of one or more of the circuits would be indicated.

There is thus provided a novel and effective indicating system for lighting circuits which is inexpensive and requires no additional elements such as relays or the like. The invention operates on the principle of extinguishing a normally illuminated, high resistance pilot lamp by providing a low resistance shunt circuit therefor upon operation of a control switch for a main lamp.

While specific embodiments of the invention have been shown and described in detail to illustrate the application of the principles thereof, it will be understood that the invention may be otherwise embodied without departing from such principles.

What is claimed is:

1. In an electric ignition and lighting system for motor vehicles comprising a source of electrical energy and an ignition switch for energizing and deenergizing the ignition system, a lighting system comprising first and second main lamps; a first indicator lamp connected in series circuit relation between the switch and one terminal of the first lamp, and a second indicator lamp connected in series circuit relation between the switch and one terminal of the second lamp, so that current flows through said lamps when said switch is closed; the resistance of said indicator lamps being sufficiently high to prevent current flow through said main lamps to illuminate the latter; and a control switch connected to the ignition switch in shunt circuit relation with said indicator lamps and movable from an off position to selectively connect said one terminal of either main lamp to the ignition switch to shunt either indicator lamp and effect illumination of the selected main lamp.

2. In an electric ignition and lighting system for motor vehicles comprising a source of electrical energy and an ignition switch for energizing and deenergizing the ignition system, a directional lighting system comprising first and second sets of directional signal lamps; a first set of indicator lamps one of which is connected in series circuit relation between the switch and one terminal of one lamp of said first set, and a second set of indicator lamps one of which is connected in series circuit relation between the switch and one terminal of one lamp of said second set, so that current flows through said indicator lamps when said switch is closed; the resistances of said indicator lamps being sufficiently high to prevent current flow through said directional lamps to illuminate the latter; and a signal control switch connected to the ignition switch in shunt circuit relation with said indicator lamps and movable from an off position to selectively engage said one contact of either set of directional lamps to shunt their corresponding indicator or lamps and effect illumination of the selected set of directional lamps.

JESSE R. HOLLINS.

REFERENCES CITED

The following references are of record in the file of this patent:

UNITED STATES PATENTS

| Number | Name | Date |
| --- | --- | --- |
| 1,535,263 | Smetzer | Apr. 28, 1925 |
| 1,747,252 | Leamon | Feb. 18, 1930 |
| 1,909,712 | Oppegaard | May 16, 1933 |
| 2,215,229 | Pubus | Sept. 17, 1940 |
| 2,258,747 | Doane | Oct. 14, 1941 |
| 2,402,312 | Burch | June 18, 1946 |